United States Patent [19]

Dye et al.

[11] 3,854,800

[45] Dec. 17, 1974

[54] REFLECTING DEVICE CONSTRUCTION

[75] Inventors: John A. Dye, Lake Park; Joe F. Arnold, North Palm Beach, both of Fla.

[73] Assignee: United Aircraft Corporation, East Hartford, Conn.

[22] Filed: Jan. 26, 1973

[21] Appl. No.: 326,913

[52] U.S. Cl. .................................. 350/310, 350/288
[51] Int. Cl. ............................................. G02b 5/08
[58] Field of Search ............ 350/310, 288; 210/446; 156/330; 331/94.5, 288-310

[56] References Cited
UNITED STATES PATENTS

| | | | |
|---|---|---|---|
| 2,425,022 | 8/1947 | Bart .................................... | 350/310 |
| 3,637,296 | 1/1972 | McLafferty et al. ................ | 350/310 |
| 3,645,608 | 2/1972 | Staley et al. ........................ | 350/310 |
| 3,683,297 | 8/1972 | Hobart et al. ...................... | 350/310 |
| 3,713,728 | 1/1973 | Austin et al. ....................... | 350/310 |
| 3,741,858 | 6/1973 | Fujiwara et al. .................... | 156/330 |
| 3,747,771 | 7/1973 | Ruthrof ............................... | 210/446 |

Primary Examiner—Ronald L. Wibert
Assistant Examiner—Michael J. Tokar
Attorney, Agent, or Firm—Jack N. McCarthy

[57] ABSTRACT

A laser mirror is constructed to provide a reflecting surface having a minimum amount of distortion while it is reflecting a high-power high-quality laser beam. The mirror is constructed having a backing plate made of a vitreous ceramic which has a very low coefficient of thermal expansion and a stiffness comparable to many metals. The reflecting surface is formed on a heat exchanger plate means which is bonded to said vitreous ceramic and has a manifold on each end. A coolant is passed through said heat exchanger plate means to reduce internal thermal response. The heat exchanger plate means can be formed from two preformed metal plates or one metal plate with a second plate being formed by plating.

The invention herein described was made in the course of or under a contract or subcontract thereunder with the Department of the Air Force.

3 Claims, 5 Drawing Figures

PATENTED DEC 17 1974 3,854,800
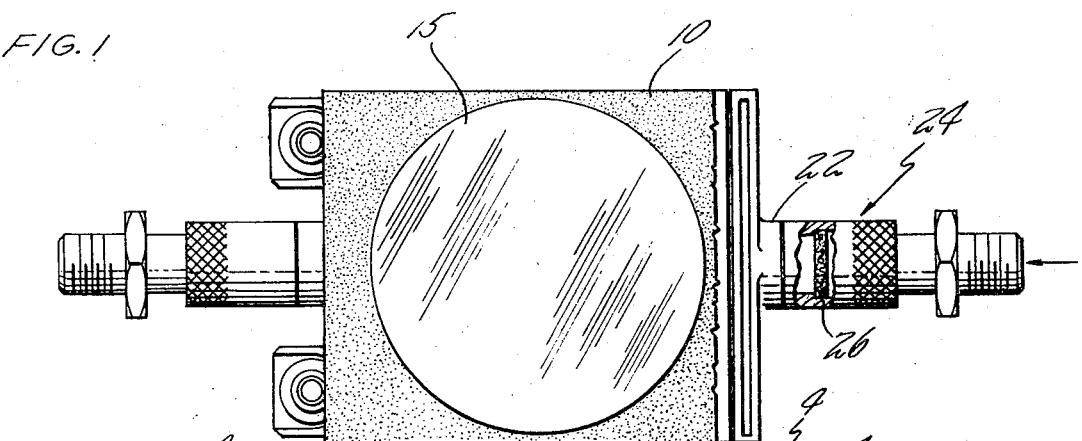
FIG.1
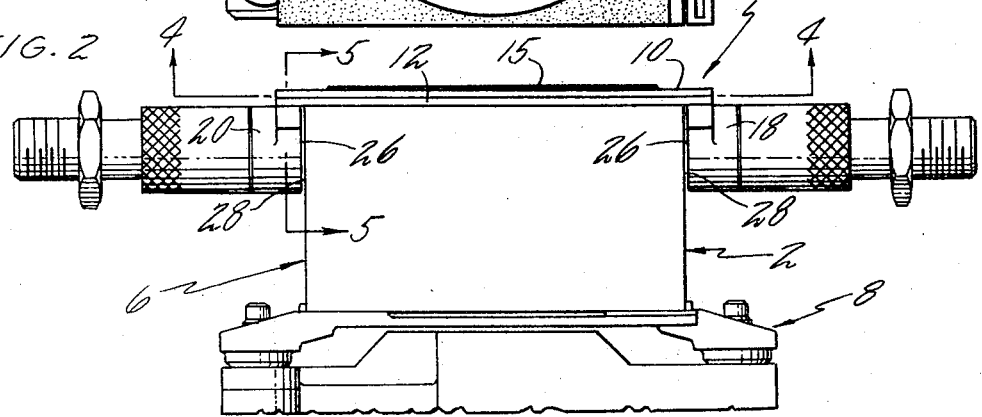
FIG.2
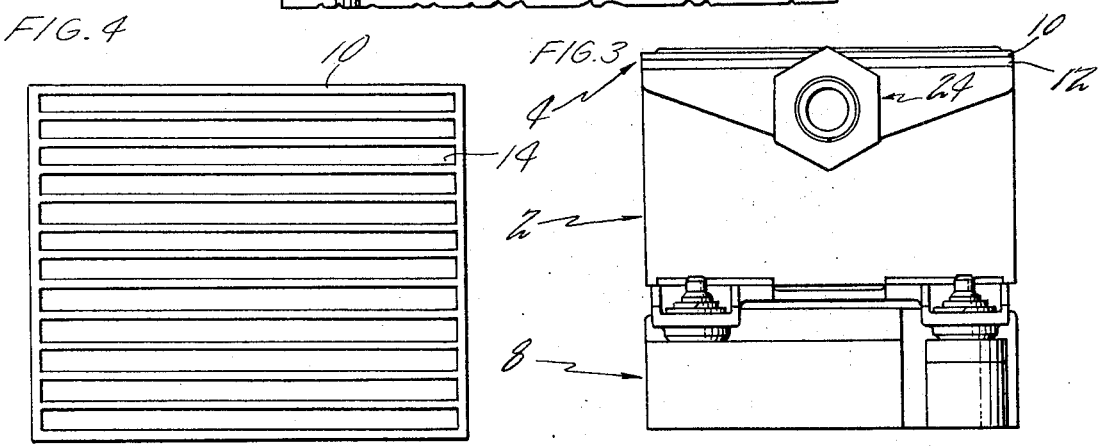
FIG.3
FIG.4
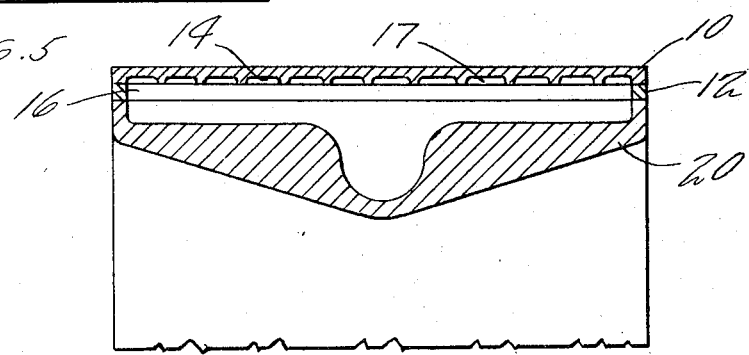
FIG.5

REFLECTING DEVICE CONSTRUCTION

BACKGROUND OF THE INVENTION

This invention relates to laser mirrors and particularly to those of high-power high-quality.

The output efficiency and quality of high-power laser systems are to a large extent, controlled by the ability of the optical elements in the system to maintain their optical figure and reflectivity. The intensity levels produced in high-power gas dynamic lasers necessitated the development of cooled mirrors.

Beam quality is a measure of the deliverability of the output radiation that can be obtained from any laser system and is a function of the amplitude and phase distribution in the output beam. Of the various factors that limit the obtainable beam quality of a high-power laser, potentially one of the most significant is the distortion of the mirrors used to fold the high-power beam through the optical cavity, transfer the beam from one cavity to the other, and to control and direct the output beam.

Packaging considerations, and the desire to achieve maximum energy extraction from the active medium make a relatively large number of extraction passes in a high-power laser desirable. This increases the number of mirrors required to direct the beam through the cavity. The complex optical systems required to expand, direct, and focus the output radiation further increase the number of mirrors in the optical train. As the number of mirrors is increased, the quality degradation associated with radiation-induced mirror distortion will increase unless the distortion of each mirror in the system can be limited.

The feasibility of using laser systems for various missions is directly related to their ability to deliver high-radiation intensities at relatively long ranges. Since the radiation intensity level is limited by diffraction, these high-delivered intensities can only be achieved by increasing the laser power output or by increasing the size of the output beam-control optics. Both of these techniques require improvements in mirror technology. The mirror disclosed herein is an improvement.

The surface of any mirror has a small, but finite, absorptivity. A small portion of the radiant energy incident upon the mirror surface is, therefore, absorbed as thermal energy. This energy absorption and its subsequent removal by the coolant induces a thermal distortion of the mirror surface. The distortion of the mirror surface means that different portions of the beam travel slightly greater distances between the mirror surface and some reference plane.

In addition, these directional changes cause the beam to intercept the other mirrors in the optical system at different relative positions on the mirror surfaces and at different relative angles. This multireflection mirror-train effect tends to magnify the directional errors induced by the mirror surface distortions. The amount of this magnification of directional error and the associated phase variation is a function of the mirror surface contour distortion and the number, the relative position, and the orientation of all the mirrors in the optical train.

Two cooled reflecting devices are shown in U.S. Pat. No. 3,637,296 and U.S. Pat. No. 3,645,608.

SUMMARY OF THE INVENTION

A primary object of the present invention is to produce a high-power high-quality cooled laser mirror. In accordance with the present invention a mirror is formed having a backing plate made of vitreous ceramic with a reflecting surface formed on a heat exchanger plate means bonded thereto with the heat exchanger plate means being formed of two metal plates. This effectively stiffens the reflective surface on the face plate of the heat exchanger plate means against thermally induced bending since the vitreous ceramic will not contribute additional undesired bending distortion due to its own thermal response.

In accordance with an aspect of the present invention, manifolds are provided at each end of the heat exchanger plate means to direct a coolant into said means and away therefrom. The manifolds are spaced from the backing plate to provide a spacing therebetween permitting freedom of movement.

In accordance with a further aspect of the present invention, the face plate can be plated onto the closure plate as by electroplating. Said face plate being formed over material on said closure plate which can be later melted out leaving a desired passage pattern therein.

BRIEF DESCRIPTION OF THE DRAWINGS

FIG. 1 is a top view of a cooled reflecting device constructed in accordance with the present invention.

FIG. 2 is a side view of the cooled reflecting device shown in FIG. 1.

FIG. 3 is an end view taken from the left of FIG. 2.

FIG. 4 is a view taken along the line 4—4 of FIG. 2.

FIG. 5 is an enlarged view taken along the line 5—5 of FIG. 2.

DESCRIPTION OF THE PREFERRED EMBODIMENTS

The reflecting device 2 comprises three main parts; Part (1) includes the cooled reflecting surface on a heat exchanger plate means with coolant manifolding 4, Part (2) includes the backing member 6, and Part (3) includes the mounting means 8. Part (1) is formed having a metallic face plate 10 fixed to a metallic closure plate 12. The face plate 10 has a plurality of grooves 14 extending along the inner surface thereof and has a reflecting surface 15 formed on the outer surface thereof. The closure plate 12 has a slot 16 along each end which connects the ends of the grooves 14. An inlet manifold 18 is attached to one end of the closure plate 12 enclosing the slot 16, and an outlet manifold 20 is attached to the other end of the closure plate 12 enclosing the other slot 16. Each inlet and outlet manifold, 18 and 20, extends from the closure plate in a cantilevered manner and has a tubular projection 22 extending to the side for directing a coolant flow into and out of the respective manifolds, coupling adapters 24 are fixed to said tubular projections 22 for attachment respectively to a coolant supply and discharge area. The coupling adapter 24 for inlet manifold 18 contains a filter 26 to prevent clogging of the passages 17 formed by the grooves 14 of face plate 10 with the mating surface of closure plate 12. In operation a coolant enters the inlet manifold 18 through the filter 26 from a coolant supply and passes upwardly through slot 16 to one end of the passages 17. The flow then follows the passages 17 to the slot 16 on the opposite side and flows down into the outlet manifold 20 and thereon to a discharge area.

The face plate 10 is brazed to closure plate 12 forming a heat exchanger plate means with passages 17, and then the inlet manifold 18 and outlet manifold 20 are brazed to their respective ends of the heat exchanger plate means enclosing the slots 16, thereby forming a device wherein coolant can enter the inlet manifold flow, pass through the heat exchanger plate means, and exit out of the outlet manifold.

The backing member 6 is formed as a relatively thick block having a top surface onto which the bottom of closure plate 12 is bonded and a bottom surface which is bonded to the mounting means 8 which fixes the reflecting device 2 for operation in its environment. The mounting means 8 is shown in detail in Copending application Ser. No. 327,024, filed concurrently herewith, to Sciaccia et al.

The block forming the backing member 6 is rectangular, its top surface extends for the width of the heat exchanger plate means, which is the width of the plates 10 and 12, and its length is such that when it is positioned between the inner ends 26 of the inlet and outlet manifolds 18 and 20, a space 28 is provided. In one reflecting device, the face plate 10 and closure plate 12 were made of a very high strength molybdenum alloy, (TZM), with the plates being brazed together. The brazing operation was done at approximately 1,500° and gold-nickel braze was used. The manifolds 18 and 20 were then brazed to the bottom of closure plate 12. The brazing operation was done at approximately 1,200° and copper-nickel braze was used. The backing member 6 was formed from a glass, or vitreous, ceramic substrate, CER-VIT$_R$ being used. The reflecting surface 15 was formed by a gold-chrome coating. The bottom of the closure plate 12 (TZM) was bonded to the backing member 6 (CER-VIT$_R$ C-101) using the following procedure:

1. Mix an epoxy (Eccobond 51) according to instructions,
2. Rinse mating surfaces of plate and backing member with alcohol,
3. Apply uniform thin coating of epoxy mix, approximately 0.005 inch to both surfaces,
4. Position coated areas together so that movement is restricted. No additional pressure is needed in addition to that supplied by the part.
5. Cure for minimum of 12 hours at room temperature.

In preparation for bonding, the vitreous ceramic is degreased and the surface to be bonded etched with one part hydrofluoric acid with nine parts of water for approximately 5 minutes, rinsed with flowing water, and the etched surface wiped to remove any white powdery residue. The molybdenum is vapor blasted with the finest grit of aluminum oxide.

The heat exchanger plate means has been disclosed as being formed of two metallic plates, a face plate 10 and a closure plate 12. While these may be two preformed plates, the heat exchanger plate means can be constructed by preforming one plate and electroplating the other plate thereon, with desired passages being formed therebetween. The passages can be formed by either of the following methods:

1. grooves can be formed in a flat preformed plate with the grooves filled with masking material, then the other plate is electroplated on; or
2. a preformed plate can be made having a flat surface with masking material placed thereon having the desired configuration of the groove pattern to be located in the manifold, then the other plate is electroplated on the preformed plate over the masking material.

In either case the masking material can be removed, for example by melting out, after the manifold is formed. This unit can then have an inlet manifold 18 and an outlet manifold 20 added thereto. The unit is then bonded to the backing member 6 in the same manner as set forth above. Brazing temperatures are given in degrees Fahrenheit.

We claim:
1. A laser mirror including means for reflecting a high-power high-quality beam while maintaining a high quality, said means including a face plate, a closure plate fixed thereto, one of said plates having a plurality of grooves therein facing the other plate, one of said plates having a first slot connecting the grooves at one end, one of said plates having a second slot connecting the grooves at the other end, a first manifold connected to said plate containing said first slot for directing a coolant to said first slot, said first manifold extending away from said plate to which it is connected, a second manifold connected to said plate containing said second slot for directing a coolant away from said second slot, said second manifold extending away from said plate to which it is connected, a backing member being located between said first and second manifolds, said backing member having a flat surface, said closure plate having a bottom surface bonded to said flat surface of said backing member, said backing member having mounting means fixed thereto, said first and second manifolds extending away from said closure plate in a cantilevered manner, said manifolds being spaced from the sides of the backing member, a reflecting surface being located on said face plate.

2. A laser mirror as set forth in claim 1 wherein the backing member is formed of a vitreous ceramic, providing a stiff backing member having essentially a zero coefficient of thermal expansion.

3. A laser mirror as set forth in claim 1 wherein the bottom surface of said closure plate is bonded by an epoxy to the flat surface of the backing member.

* * * * *